(12) United States Patent
Flick

(10) Patent No.: US 6,297,731 B1
(45) Date of Patent: Oct. 2, 2001

(54) VEHICLE REMOTE CONTROL SYSTEM HAVING KEYLESS ENTRY AND PIGGYBACK CONTROL FEATURES AND ASSOCIATED METHODS

(76) Inventor: Kenneth E. Flick, 5236 Presley Pl., Douglasville, GA (US) 30135

( * ) Notice: Subject to any disclaimer, the term of this patent is extended or adjusted under 35 U.S.C. 154(b) by 0 days.

(21) Appl. No.: 09/487,446

(22) Filed: Jan. 19, 2000

Related U.S. Application Data

(63) Continuation-in-part of application No. 09/382,245, filed on Aug. 25, 1999, which is a continuation of application No. 09/023,838, filed on Feb. 13, 1998, now Pat. No. 6,011,460, which is a continuation-in-part of application No. 08/701,356, filed on Aug. 22, 1996, now Pat. No. 5,719,551.

(51) Int. Cl.[7] .................................................. B60R 25/10

(52) U.S. Cl. ........................... 340/426; 340/539; 340/5.1; 340/5.61; 340/5.72; 340/825.69; 340/825.79; 307/10.2; 180/287

(58) Field of Search ................................ 340/426, 425.5, 340/531, 533, 539, 5.1, 5.2, 5.61, 5.64, 5.72, 825.36, 825.69, 825.72; 341/173, 176; 307/10.2, 10.4, 10.5, 10.3; 180/287

(56) References Cited

U.S. PATENT DOCUMENTS

| | | | |
|---|---|---|---|
| 4,055,772 | 10/1977 | Leung ................................ | 307/10 R |
| 4,288,778 | 9/1981 | Zucker ................................. | 340/64 |
| 4,538,262 | 8/1985 | Sinniger et al. ....................... | 370/85 |
| 4,697,092 | 9/1987 | Roggendorf et al. ............... | 307/10 R |
| 4,754,255 | 6/1988 | Saunders et al. ..................... | 340/64 |
| 4,760,275 | 7/1988 | Sato et al. .......................... | 307/10 R |
| 4,792,783 | 12/1988 | Burgess et al. ....................... | 340/22 |
| 4,841,159 | 6/1989 | Evans et al. ............................ | 307/38 |

(List continued on next page.)

FOREIGN PATENT DOCUMENTS

| | | | |
|---|---|---|---|
| 195 30 721 A1 | 2/1997 | (DE) | H02J/9/04 |
| 0 699 562 A2 | 7/1995 | (EP) | B60R/16/02 |
| WO 97/28988 | 8/1997 | (WO) | B60R/16/02 |

OTHER PUBLICATIONS

Society of Automotive Engineers, Inc., "Surface Vehicle Information Report," SAE J2058 (Jun. 21, 1990).
Society of Automotive Engineers, Inc., "Surface Vehicle Standard," SAE J1850 (rev'd Jul. 1995).
Mark Thompson, "The Thick and Thin of Car Cabling," *IEEE Spectrum*, pp. 42–45 (Feb. 1996).

*Primary Examiner*—Daniel J. Wu
*Assistant Examiner*—Toan Pham
(74) *Attorney, Agent, or Firm*—Allen, Dyer, Doppelt, Milbrath & Gilchrist, P.A.

(57) ABSTRACT

A vehicle control system includes a data communications bus, a remote keyless entry (RKE) system, and a piggyback controller at the vehicle for performing a desired function based upon predetermined RKE signals generated on the data communications bus by the RKE controller. The RKE system may include an RKE transmitter to be carried by a user, an RKE receiver, and the RKE controller connected to the RKE receiver for generating the RKE signals on the data communications bus responsive to the RKE transmitter. An RKE actuator is connected to the bus for performing an RKE function. The piggyback controller permits the straightforward addition of one or more new remote control functions to a vehicle already including a remote keyless entry system and a data communications bus. The piggyback controller may comprise a piggyback alarm controller connected to at least one vehicle security sensor. The desired function may then be switching the piggyback alarm controller between an armed mode, capable of generating an alarm based upon the at least one vehicle security sensor, and a disarmed mode. In another advantageous embodiment of the invention, a remote start function can be piggybacked onto an existing RKE system.

44 Claims, 5 Drawing Sheets

U.S. PATENT DOCUMENTS

| | | | |
|---|---|---|---|
| 4,926,332 | 5/1990 | Komuro et al. | 364/424.05 |
| 5,006,843 | 4/1991 | Hauer | 340/825.31 |
| 5,040,990 | 8/1991 | Suman et al. | 439/34 |
| 5,046,041 | 9/1991 | Lecocq et al. | 364/900 |
| 5,049,867 | 9/1991 | Stouffer | 340/426 |
| 5,054,569 | 10/1991 | Scott et al. | 180/167 |
| 5,081,667 | 1/1992 | Drori et al. | 379/59 |
| 5,142,278 | 8/1992 | Moallemi et al. | 340/825.06 |
| 5,146,215 | 9/1992 | Drori | 340/825.32 |
| 5,243,322 | 9/1993 | Thompson et al. | 340/429 |
| 5,252,966 * | 10/1993 | Lambropoulos et al. | 340/825.69 |
| 5,278,547 * | 1/1994 | Suman et al. | 340/825.32 |
| 5,382,948 * | 1/1995 | Richmond | 340/825.36 |
| 5,406,270 | 4/1995 | Van Lente | 340/825.34 |
| 5,473,540 | 12/1995 | Schmitz | 701/1 |
| 5,475,818 | 12/1995 | Molyneaux et al. | 395/200.05 |
| 5,521,588 | 5/1996 | Kuhner et al. | |
| 5,523,948 | 6/1996 | Adrain | |
| 5,555,498 | 9/1996 | Berra et al. | 364/424.03 |
| 5,563,600 * | 10/1996 | Miyake | 341/173 |
| 5,606,306 | 2/1997 | Mutoh et al. | 340/426 |
| 5,719,551 | 2/1998 | Flick | 340/426 |
| 5,818,329 * | 10/1998 | Allen | 340/426 |
| 5,832,397 | 11/1998 | Yoshida et al. | 701/29 |
| 5,838,255 * | 11/1998 | Di Croce | 340/825.69 |
| 5,850,174 * | 12/1998 | DiCroce et al. | 340/426 |
| 6,011,460 * | 1/2000 | Flick | 340/426 |
| 6,075,454 * | 6/2000 | Yamasaki | 340/825.31 |

* cited by examiner

VEHICLE REMOTE CONTROL SYSTEM HAVING KEYLESS ENTRY AND PIGGYBACK CONTROL FEATURES AND ASSOCIATED METHODS

RELATED APPLICATIONS

The present application is a continuation-in-part of U.S. patent application Ser. No. 09/382,245 filed Aug. 25, 1999, which in turn, is a continuation of U.S. Ser. No. 09/023,838 filed Feb. 13, 1998, now U.S. Pat. No. 6,011,460, which in turn, is a continuation-in-part of U.S. Ser. No. 08/701,356 filed Aug. 22, 1996, now U.S. Pat. No. 5,719,551 the disclosures of all being incorporated herein by reference.

FIELD OF THE INVENTION

The invention relates to the field of vehicle control systems, and, more particularly to vehicle remote control systems and related methods.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulous et al. discloses a remote keyless entry (RKE) system for a vehicle. The RKE system permits the user to remotely open the vehicle doors or open the vehicle trunk using a small handheld transmitter.

Unfortunately, the majority of vehicle security systems need to be directly connected by wires to individual vehicle devices, such as the vehicle horn or door switches of the vehicle. In other words, a conventional vehicle security system is hardwired to various vehicle components, typically by splicing into vehicle wiring harnesses or via interposing T-harnesses and connectors. The number of electrical devices in a vehicle has increased so that the size and complexity of wiring harnesses has also increased. For example, the steering wheel may include horn switches, an airbag, turn-signal and headlight switches, wiper controls, cruise control switches, ignition wiring, an emergency flasher switch, and/or radio controls. Likewise, a door of a vehicle, for example, may include window controls, locks, outside mirror switches, and/or door-panel light switches.

In response to the increased wiring complexity and costs, vehicle manufacturers have begun attempts to reduce the amount of wiring within vehicles to reduce weight, reduce wire routing problems, decrease costs, and reduce complications which may arise when troubleshooting the electrical system. For example, some manufacturers have adopted multiplexing schemes to seduce cables to three or four wires and to simplify the exchange of data among the various onboard electronic systems as disclosed, for example, in "The Thick and Thin of Car Cabling" by Thompson appearing in the IEEE Spectrum, Feb. 1996, pp. 42–45.

Implementing multiplexing concepts in vehicles in a cost-effective and reliable manner may not be easy. Successful implementation, for example, may require the development of low or error-free communications in what can be harsh vehicle environments. With multiplexing technology, the various electronic modules or devices may be linked by a single signal wire in a bus also containing a power wire, and one or more ground wires. Digital messages are communicated to all modules over the data communications bus. Each message may have one or more addresses associated with it so that the devices can recognize which messages to ignore and which messages to respond to or read.

The Thompson article describes a number of multiplexed networks for vehicles. In particular, the Grand Cherokee made by Chrysler is described as having five multiplex nodes or controllers: the engine controller, the temperature controller, the airbag controller, the theft alarm, and the overhead console. Other nodes for different vehicles may include a transmission controller, a trip computer, an instrument cluster controller, an antilock braking controller, an active suspension controller, and a body controller for devices in the passenger compartment.

A number of patent references are also directed to digital or multiplex communications networks or circuits, such as may be used in a vehicle. For example, U.S. Pat. No. 4,538,262 Sinniger et al. discloses a multiplex bus system including a master control unit and a plurality of receiver-transmitter units connected thereto. Similarly, U.S. Pat. No. 4,055,772 to Leung discloses a power bus in a vehicle controlled by a low current digitally coded communications system. Other references disclosing various vehicle multiplex control systems include, for example, U.S. Pat. No. 4,760,275 to Sato et al.; U.S. Pat. No. 4,697,092 to Roggendorf et al.; and U.S. Pat. No. 4,792,783 to Burgess et al.

Several standards have been proposed for vehicle multiplex networks including, for example, the Society of Automotive Engineers "Surface Vehicle Standard, Class B Data Communications Network Interface", SAE J1850, July 1995. Another report by the SAE is the "Surface Vehicle Information Report, Chrysler Sensor and Control (CSC) Bus Multiplexing Network for Class 'A' Applications", SAE J2058, July 1990. Many other networks are also being implemented or proposed for communications between vehicle devices and nodes or controllers.

Unfortunately, conventional vehicle security systems for hardwired connection to vehicle devices, such as aftermarket vehicle security systems, are not readily adaptable to a vehicle including a data communications bus. Moreover, a vehicle security system if adapted for a communications bus and devices for one particular model, model year, and manufacturer, may not be compatible with any other models, model years, or manufacturers. Other systems for remote control of vehicle functions may also suffer from such shortcomings.

Yet another shortcoming of conventional vehicle security systems, particularly of the aftermarket type, is that they would require two transmitters to be carried by the user if a remote keyless entry (RKE) system is already installed in the vehicle from the manufacturer. An RKE system typically includes a remote RKE transmitter that sends signals to an RKE receiver in the vehicle. The receiver, in turn, is connected to an RKE controller which outputs appropriate RKE signals over the data bus, such as to lock and unlock the doors.

In other words, the user needs the RKE transmitter to lock and unlock doors, while the security system transmitter is needed to arm and disarm the security system. The shortcoming of the two transmitter approach could be overcome by interfacing the security controller to the RKE system; however, this may be relatively complex and would render the already purchased RKE transmitter useless.

Another similar shortcoming occurs when remote engine starting is to be added to a vehicle already including an RKE system coupled to the vehicle communications data bus. Again, multiple handheld transmitters must be used, or complicated interfacing is needed.

SUMMARY OF THE INVENTION

In view of the foregoing background, it is an object of the present invention to provide a system and associated methods for readily adding or piggybacking vehicle control features or functions to a vehicle already including an RKE system connected to a data communications bus.

These and other objects, features and advantages in accordance with the present invention are provided by a vehicle control system comprising a data communications bus, a remote keyless entry (RKE) system, and a piggyback remote controller at the vehicle for performing a desired piggyback control function based upon predetermined RKE signals generated on the data communications bus by the RKE controller. The RKE system may include an RKE transmitter to be carried by a user, an RKE receiver, the RKE controller connected to the RKE receiver for generating the RKE signals on the data communications bus responsive to the RKE transmitter, and at least one RKE actuator for performing an RKE function responsive to RKE signals. The piggyback controller permits the straightforward addition of one or more new remote control functions to a vehicle already including an RKE system and a data communications bus.

The vehicle control system may include at least one vehicle sensor connected to the piggyback controller. In one embodiment, the at least one vehicle sensor comprises at least one vehicle security sensor. Accordingly, in this embodiment the piggyback controller comprises a piggyback alarm controller connected to the at least one vehicle security sensor. The desired piggyback control function may then be switching the piggyback alarm controller between an armed mode, capable of generating an alarm based upon the at least one vehicle security sensor, and a disarmed mode.

The predetermined RKE signals may comprise door lock and door unlock signals. In particular, driver's door unlock signals may be used for switching to the disarmed mode. The predetermined RKE signals may also comprise at least one, or patterns, of door lock signals, door unlock signals, trunk release signals, light control signals, and horn control signals.

In another advantageous embodiment of the invention, a remote start function can be piggybacked onto an existing RKE system. In other words, the vehicle may comprise an engine start circuit, and the piggyback controller may include a piggyback remote start controller connected to the engine start circuit. Of course, the desired piggyback control function is activating the engine start circuit. At least one sensor may also be used in this embodiment to ensure proper vehicle conditions before starting the engine.

Yet another aspect of the invention relates to configuring the piggyback controller to operate with a particular vehicle, when vehicles may use different RKE signals. The piggyback controller may comprise desired signal enabling means for permitting performance of the desired function based upon predetermined RKE signals for a corresponding desired vehicle from a plurality of sets of RKE signals for different vehicles.

The desired signal enabling means may comprise a memory for storing a plurality of sets of RKE signals for different vehicles, and a selector for selecting predetermined RKE signals from the plurality of different sets of RKE signals for different vehicles. The selector may comprise a user selector for permitting a user to select the predetermined RKE signals.

In another variation, the desired signal enabling means may comprise bus learning means for learning the predetermined RKE signals based upon RKE signals on the data communications bus. In yet another variation, the desired signal enabling means may comprise download learning means for learning the predetermined RKE signals from a downloading device.

A method aspect of the invention is for piggybacking a desired function to a remote keyless entry (RKE) system in a vehicle of a type comprising a data communications bus. The RKE system preferably comprises an RKE transmitter to be carried by a user, an RKE receiver, an RKE controller connected to the RKE receiver for generating RKE signals on the data communications bus responsive to the RKE transmitter, and at least one RKE actuator. The method preferably comprises the steps of: connecting a piggyback controller to the data communications bus, and using the piggyback remote controller to perform a desired piggyback control function based upon predetermined RKE signals generated on the data communications bus by the RKE controller.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Prime and multiple prime notation are used to indicate similar elements in alternate embodiments.

Figure 1:
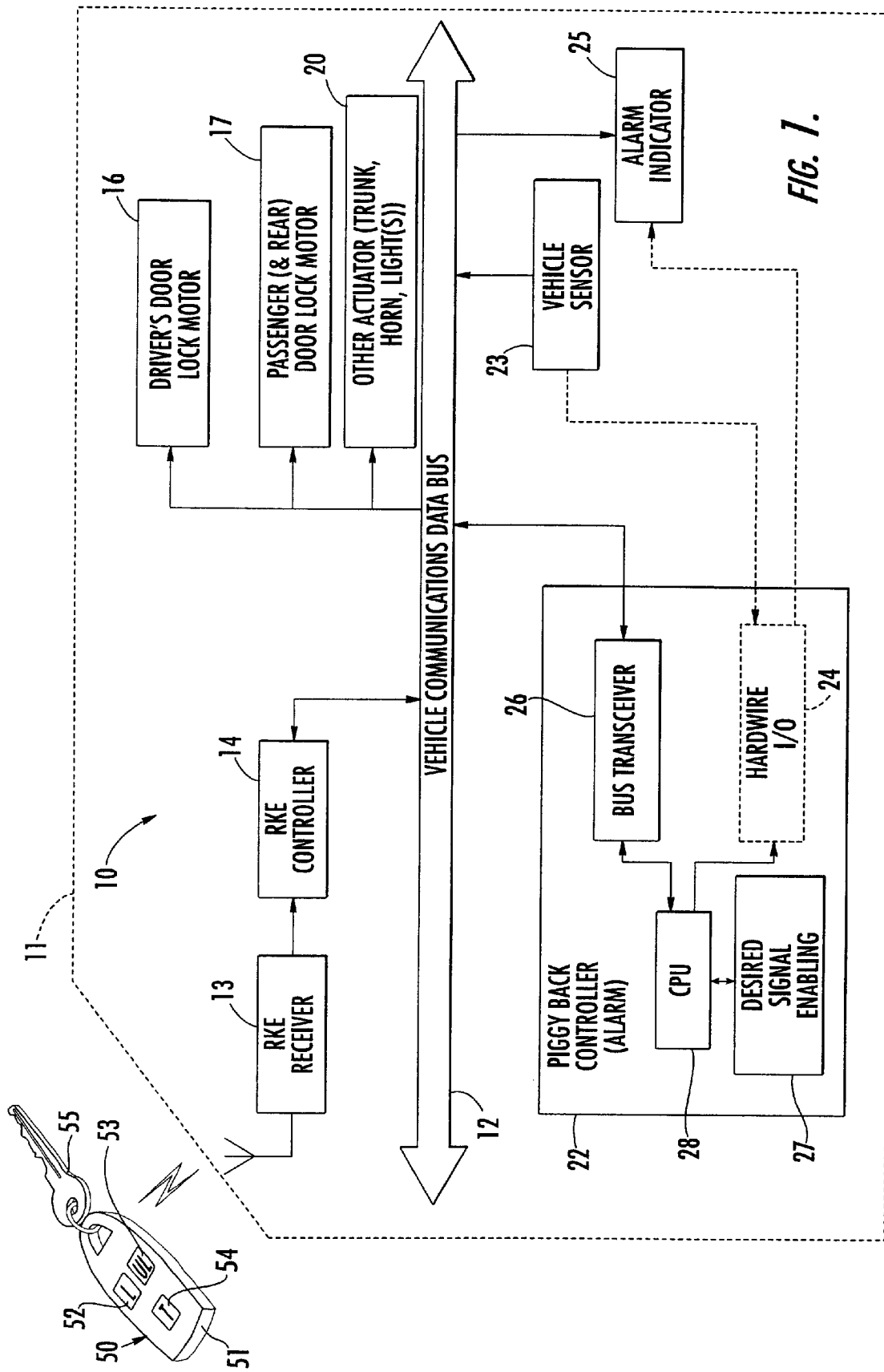
FIG. 1 is a schematic block diagram of a vehicle control system including an RKE system and a piggyback alarm controller in accordance with the present invention.

Referring now initially to FIG. 1, a first embodiment of a vehicle control system 10 is now described. The system 10 includes a data communications bus 12, and a remote keyless entry (RKE) system connected thereto. More particularly, the RKE system includes an RKE transmitter 50 to be carried by a user, an RKE receiver 13 at the vehicle 11, and an RKE controller 14 connected to the RKE receiver for generating the RKE signals on the data communications bus 12.

The RKE transmitter 50 includes a housing 51 which carries a number of user depressable buttons or switches thereon, as well as a vehicle ignition key 55. For example, the housing 51 may carry a door lock button 52, a door unlock button 53, and trunk release button 54. On the reverse side, a panic button, not shown, may be provided to permit the user to sound the horn at the vehicle as will be appreciated by those skilled in the art. The RKE transmitter 50 also typically contains a replaceable battery and associated electronics for transmitting radio signals to the RKE receiver 13 at the vehicle. Typically depressing the unlock button 53 once will open only the driver's door lock, and depressing the unlock button twice within a predetermined time window will first unlock the driver's door lock, and then unlock the passenger's side and/or rear door locks as will be readily appreciated by those skilled in the art.

In one particularly advantageous embodiment, the RKE receiver 13 is of the changing code type as will be readily appreciated by those skilled in the art. By changing code is meant that the remote transmitter 50 sends a signal including a series of bits modulated on a radio frequency carrier, for example. These bits would typically include fixed code portions as well as changing code portions. The changing code portion provides additional security for the system 10, so that unauthorized transmitters cannot be used to activate the RKE controller 14. In particular, the term changing code is meant to cover fairly short repeating codes, such as are generally described as rolling codes. Such rolling codes may repeat as often as every eight transmissions, for example. In addition, changing code is also intended to cover pseudo-random codes that may only repeat after many thousands or even millions of operations as will be understood by those skilled in the art. The remote transmitter 50 and RKE receiver 13 are synchronized together with each having the changing code pattern stored therein or generated internally as will be readily understood by those skilled in the art.

A driver's door lock and unlock motor 16 is connected to the data bus 12, along with a passenger door lock and unlock motor 17 which would also operate the vehicle rear doors if the vehicle is so equipped. As will be readily appreciated by those skilled in the art, the driver's and passenger's door lock motors 16, 17 may be connected to the bus 12 and include their own respective bus transceivers, not shown. Alternately, the door lock motors 16, 17 may be connected to the bus 12 via an intervening common or shared interface module, not shown. The door lock motors 16, 17 provide RKE actuators.

As will also be appreciated by those skilled in the art, the RKE controller 14 may also monitor the bus 12 for other signals to determined if a door lock or unlock signal should be generated. For example, the RKE controller 14 may check to see whether the key 55 is in the ignition. In addition, the RKE controller 14 may also operate other actuators 20, either directly or via a separate bus interface, such as for the trunk release, for operating the vehicle horn (such as for a panic indication), and or various internal or external vehicle lights as will be readily appreciated by those skilled in the art.

The present invention provides for a piggyback remote controller to be added, for example, to the vehicle for performing a desired function based upon predetermined RKE signals generated on the data communications bus 12 by the RKE controller 14. In other words, the piggyback controller permits the straightforward addition of one or more new remote control functions to a vehicle already including an RKE system and a data communications bus 12.

In the illustrated embodiment of FIG. 1, the vehicle control system 10 also include at least one vehicle sensor 23 connected to the piggyback alarm controller 22. This connection may be either a hardwired connection through the hardwire input/output (I/O) interface 24 or via the data communications bus 12 as will be readily appreciated by those skilled in the art. Of course, in typical embodiments, multiple sensor inputs may be monitored, such as door, hood, and trunk switches, as well as shock or proximity sensors. The piggyback controller 22 may receive these signals via the data bus 12, via hardwire connections or via a combination of both.

Similarly, an alarm indicator 25, such as may be provided by siren, may also be connected either via the data communications bus 12 or directly to the hardwire I/O interface 24 as will also be appreciated by those skilled in the art. The alarm indicator 25 may also be the vehicle horn in other embodiments. In yet other embodiments, the alarm indicator 25 may be a radio transmitter to transmit the signal to a receiver carried by the user or monitored at a central station, for example, as will be readily appreciated by those skilled in the art.

The piggyback controller 22 also illustratively includes a central processing unit (CPU) 28 connected to the bus transceiver 26 and the hardwire I/O interface 24. A desired signal enabling means or portion 27 is illustratively connected to the CPU 28. The desired signal enabling means 27 will be further described in detail below. The CPU 28 performs the various logical control functions as described herein.

In the illustrated vehicle control system embodiment 10, the piggyback controller is a piggyback alarm controller 22. Accordingly, a desired function performed by the piggyback alarm controller 22 is switching between an armed mode, capable of generating an alarm based upon the at least one vehicle security sensor 23, and a disarmed mode.

Of course, the predetermined RKE signals may comprise door lock and door unlock signals. In particular, driver's door unlock signals may be used for switching to the disarmed mode. In other words, the piggyback alarm controller 22 may switch to the disarmed mode anytime the RKE controller 14 outputs on the data communications bus 12 signals for causing only the driver's door to unlock. Alternately, the piggyback controller 22 may also need to see the ignition switch off. To switch to the armed mode, the piggyback controller 22 may need to see both the ignition switch off and a door lock command on the data communications bus 12 as will be appreciated by those skilled in the art.

The piggyback alarm controller 22 may also have a passive arming feature and a valet mode to turn off the passive arming. Passive arming may switch the controller 22 to the armed mode a predetermined time after the key 55 is removed and the last vehicle door is closed, for example. The valet mode permits turning off this feature so that others may use the vehicle. Accordingly, activation of the RKE door lock command occurring a predetermined number of times within a certain time and with the ignition switch on, may cause entry into the valet mode. Those of skill in the art will also appreciate that the predetermined RKE signals may also comprise at least one, or patterns, of door lock signals, door unlock signals, trunk release signals, light control signals, and horn control signals. Such signals may also be used to disarm from a triggered mode or to switch to an armed mode. It is preferred that the predetermined signals be such as to not conflict with other functions to be performed at the vehicle.

Figure 2:
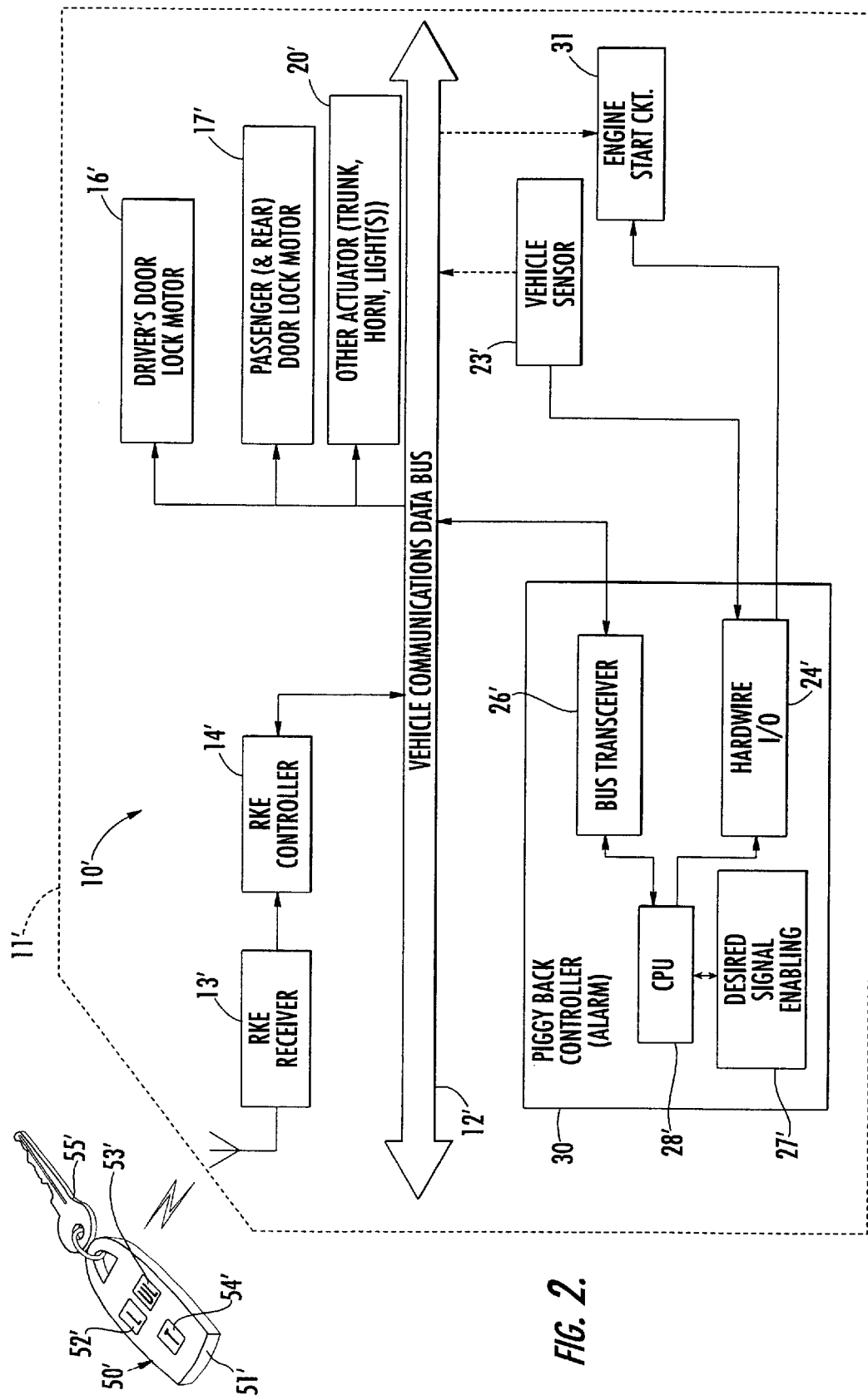
FIG. 2 is a schematic block diagram of a vehicle control system including an RKE system and a piggyback remote start controller in accordance with the present invention.

Turning now to the control system 10' shown FIG. 2, this control system includes a remote start function that can, for example, be piggybacked onto an existing RKE system using the piggyback remote start controller 30. In other words, this embodiment of the vehicle control system 10' includes the schematically illustrated engine start circuit 31 connected to the piggyback remote start controller 30, and the desired function is activating the engine start circuit. At least one sensor 23' may also be used in this embodiment to ensure proper vehicle conditions before starting the engine. The other elements similar to those of FIG. 1 are indicated with a prime and need no further discussion herein.

Those of skill in the art will readily appreciate that the engine start circuit 31 is illustrated in greatly simplified form to aid in understanding of the overall invention. Starting the engine typically involves bypassing one or more factory engine immobilization circuits, as well as cranking the engine starter, and monitoring various vehicle parameters. The monitored vehicle parameters may include brake pedal pressure, engine RPM, gear selector position, etc. as will be understood by those skilled in the art.

The connections to the vehicle sensor 23' and engine start circuit 31 may be through the vehicle data communications bus 12', or through hardwire connections. A combination of hardwire and data bus connections can also be used and are contemplated by the present invention.

Remote starting may be initiated by multiple pressings of the door unlock button 53' on the remote transmitter 50' occurring within a predetermined time window. Conversely, turning off the engine may be caused by repeated pressings of the door lock button 52'. Those of skill in the art will appreciate other commands that may be used to turn the engine on or off.

Yet another aspect of the invention relates to configuring the piggyback alarm controller 22 or piggyback remote start controller 30 to operate with a particular vehicle, when vehicles may use different RKE signals. The piggyback alarm controller 22, 30 may comprise desired signal enabling means 27, 27' for permitting performance of the desired function based upon predetermined RKE signals for a corresponding desired vehicle from a plurality of sets of RKE signals for different vehicles.

Figure 3:
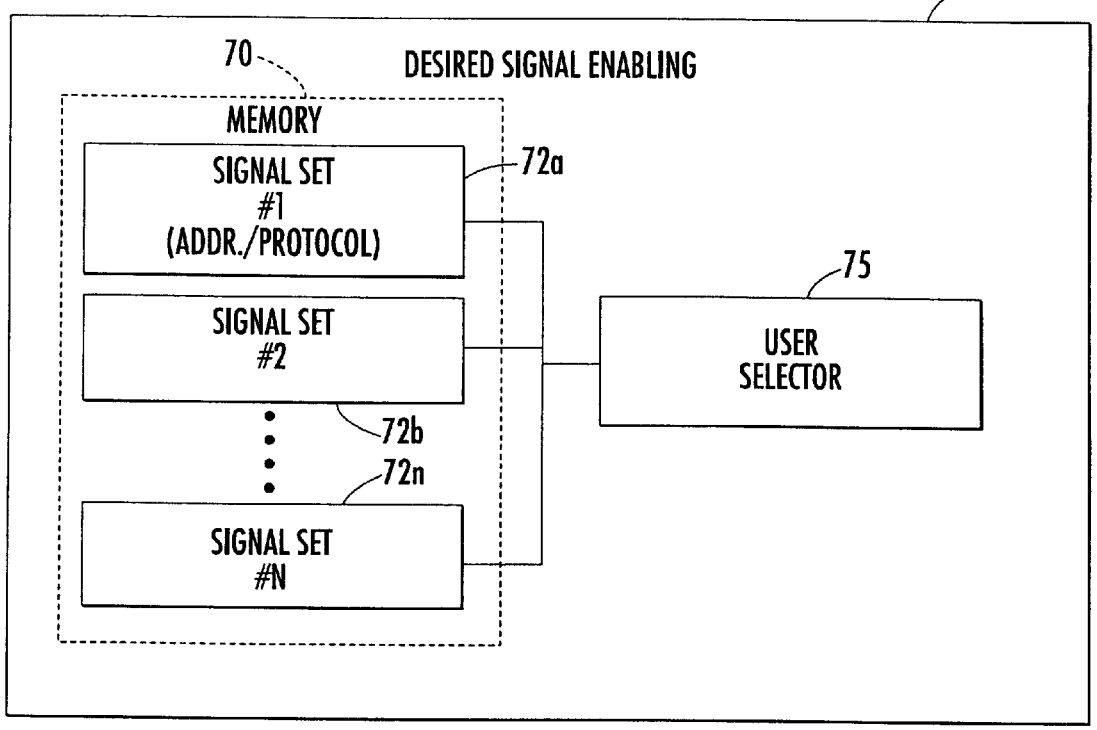
FIG. 3 is a first embodiment of the desired signal enabling portion of the piggyback controller in accordance with the invention.

Turning now additionally to FIG. 3 a first embodiment of the desired signal enabling means 27 is described. For simplicity of explanation, the desired signal enabling means 27 is described in relation to use with the piggyback alarm controller 22, while those of skill in the art will readily appreciate its applicability to the piggyback remote start controller 30 as well. The desired signal enabling means 27 permits the piggyback alarm controller 22 to operate using a desired set of signals for a desired vehicle from among a plurality of possible sets of signals for different vehicles. As would be readily understood by those skilled in the art, the term different vehicles may include vehicles from different manufacturers, different models, or even different trim levels of the same make and model. Accordingly, the desired signal enabling means 27 permits the piggyback alarm controller 22, that is, to communicate with the vehicle security sensor 23 and the alarm indicator 25 via the data communications bus 12 so that the controller is capable of operating the alarm indicator responsive to the vehicle security sensor.

In the illustrated embodiment of FIG. 3, the desired signal enabling means 27 may preferably include a memory 70 for storing a plurality of sets 72a, 72b and 72n of signals for different vehicles, and selecting means for selecting the desired set of signals from the plurality of different sets of signals for different vehicles. By storing sets of signals is meant storing information or data necessary to generate the desired signals on the data bus 12 as would be readily understood by those skilled in the art. The memory 70 may include a device address memory for storing a plurality of different sets of signals representative of different device addresses for different vehicles. Alternatively, or in addition thereto, the memory may comprise a protocol memory for storing a plurality of different protocols for different vehicles. The selecting means may comprise a user selector 75 for permitting a user to select the desired set of signals. A keypad or other input device may be used to permit the user to select the desired signal set for his vehicle. A valet switch, for example, may also be operated by the user to select the desired signal set. The user may select the desired set of signals by entering a unique digital code similar to the selection of signals for a home electronics universal remote control. Other techniques for permitting the user to select the desired signal set from a plurality of stored sets are also contemplated by the invention as would be readily appreciated by those skilled in the art.

Figure 4:
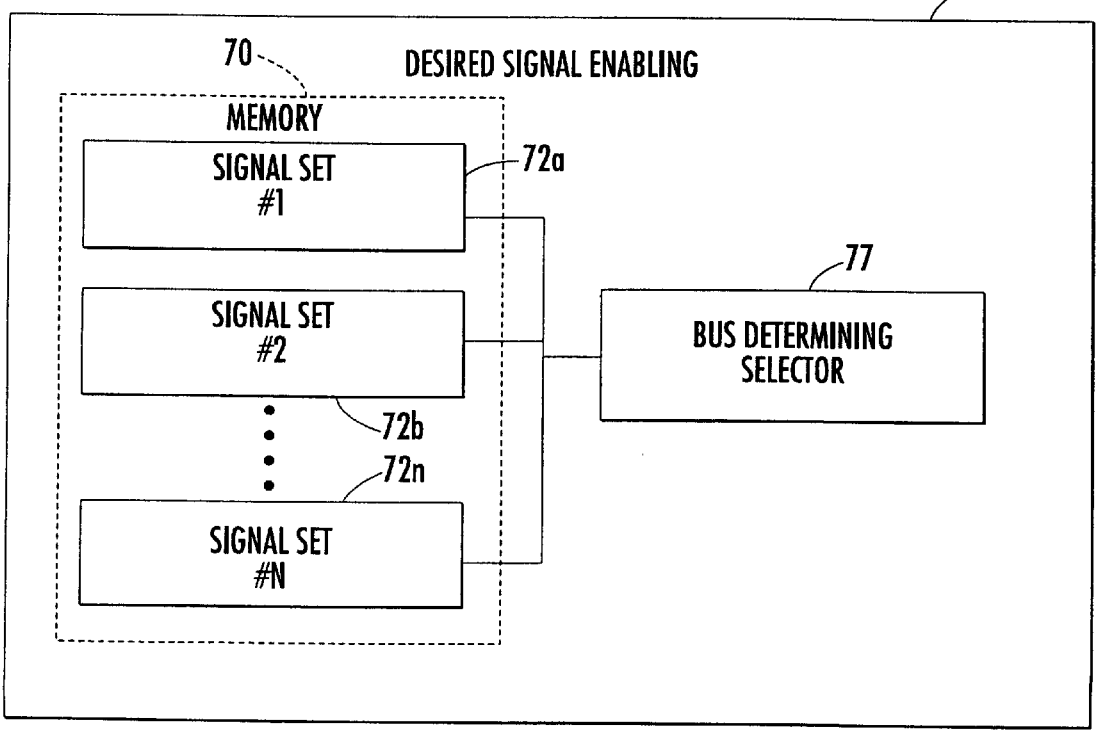
FIG. 4 is a second embodiment of the desired signal enabling portion of the piggyback controller in accordance with the invention.

Referring now additionally to FIG. 4 another embodiment of the desired signal enabling means 27' is described in accordance with the present invention. In this embodiment, the selecting means may comprise a bus determining selector 77 for determining the desired set of signals based upon signals on the data communications bus. For example, the bus determining selector could determine the desired set of signals based upon sensed voltage levels or based upon the timing of signal pulses on the data communications bus 12. The other components of this embodiment of the desired signal enabling means 27' are similar to those described above with reference to FIG. 3 and need no further description.

Figure 5:
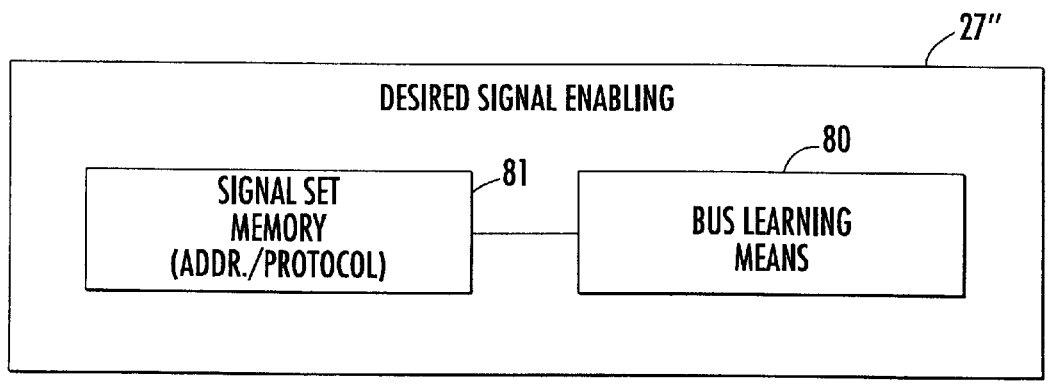
FIG. 5 is a third embodiment of the desired signal enabling portion of the piggyback controller in accordance with the invention.

Yet another embodiment of the desired signal enabling means 27" as shown in FIG. 5, the desired signal enabling means comprises a desired signal set memory 81 operatively connected to the illustrated bus learning circuit or means 80. The bus learning circuit or means 80 may determine and store in the signal set memory 81 the protocol and/or device addresses for the vehicle devices. For example, the bus learning circuit or means 80 may permit the user to operate various vehicle devices and store a desired signal set based thereon as would be readily understood by those skilled in the art. The other components of the desired signal enabling means 27" are similar to those described above with reference to FIG. 3 and need no further description.

Figure 6:
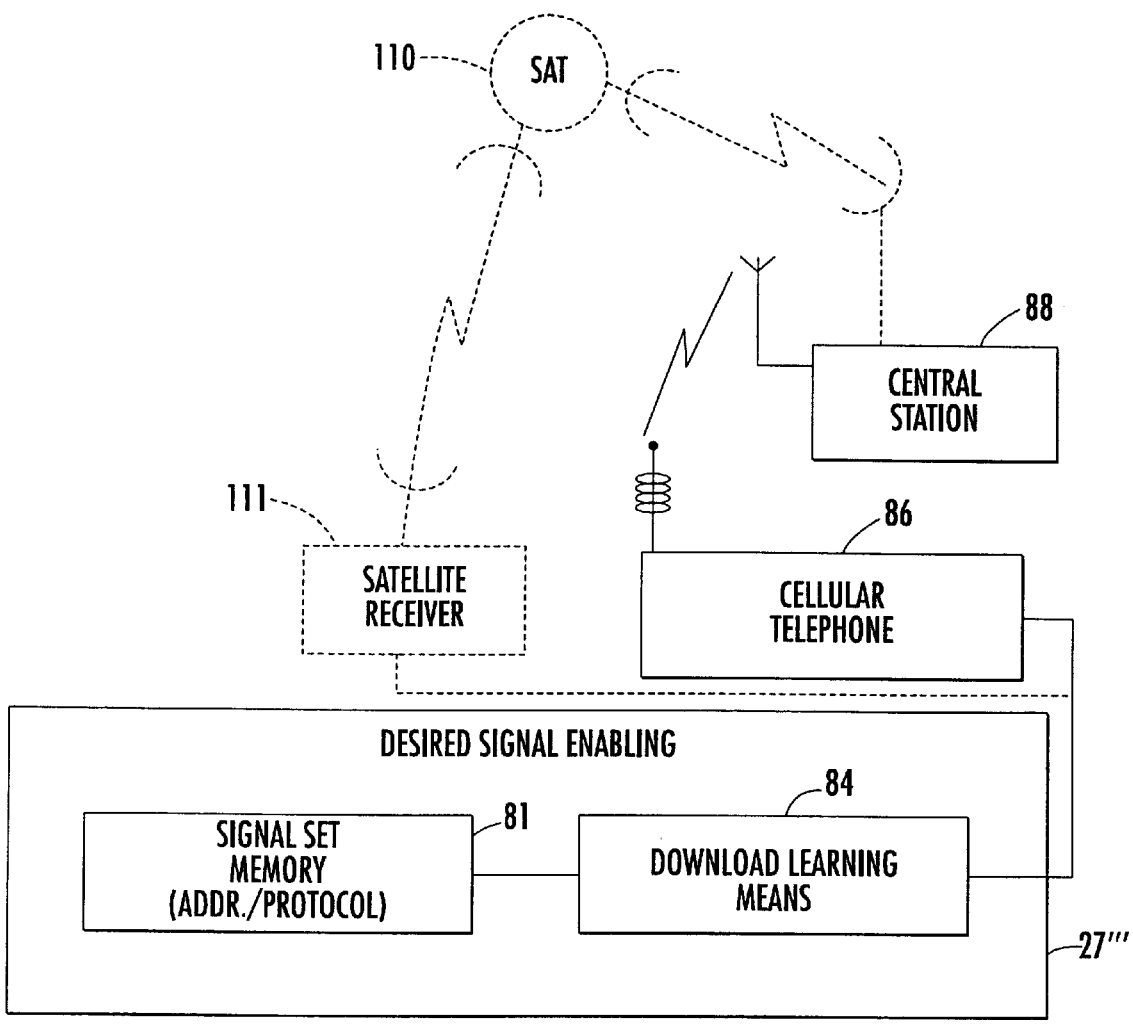
FIG. 6 is a fourth embodiment of the desired signal enabling portion of the piggyback controller in accordance with the invention.

Still another embodiment of the desired signal enabling means 27''' is explained with reference to FIG. 6. The desired signal enabling means 27''' includes a signal set memory 81 operatively connected to the schematically illustrated download learning means 84. The download learning means 84 may include an interface connected to the illustrated vehicle cellular telephone 86 to permit learning or downloading of the desired signal set from a remote or central monitoring and control station 88, for example. The desired signal set may also alternately be learned from the central station 88 through the satellite link provided by the satellite 110 and vehicle mounted satellite receiver 111 and associated antennas. As would be readily understood by those skilled in the art, the download learning means, as well as the other desired signal enabling leans may be implemented by software in the CPU 28 of the piggyback alarm controller 22 or in a separate microprocessor or circuits.

Figure 7:
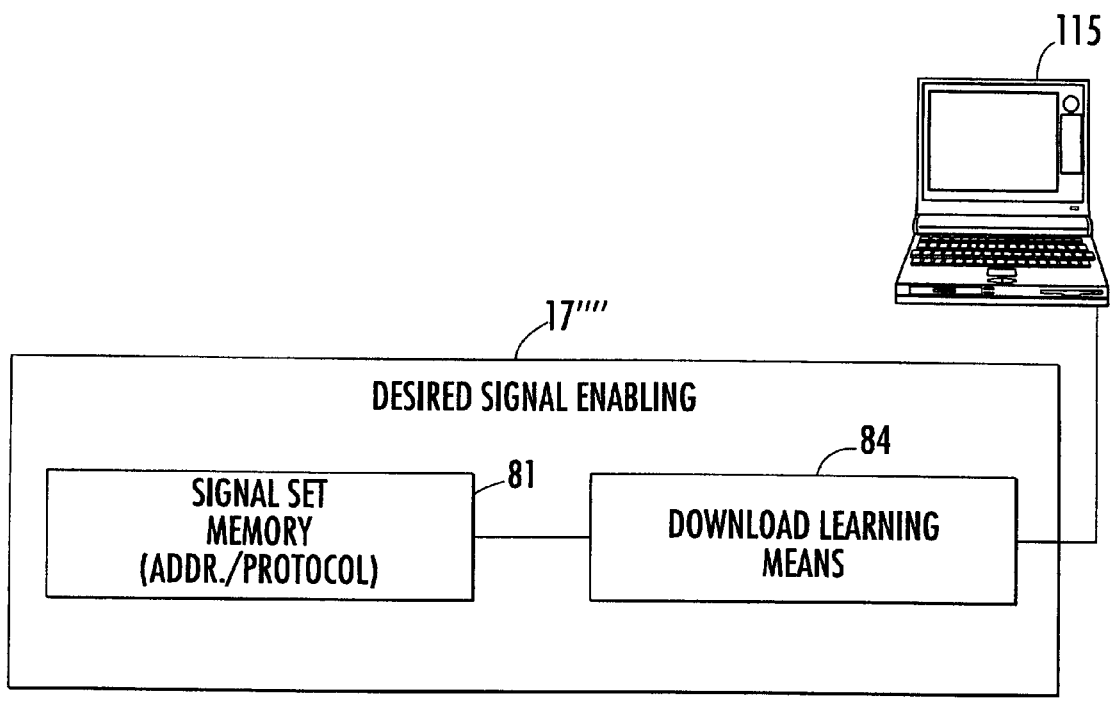
FIG. 7 is a fifth embodiment of the desired signal enabling portion of the piggyback controller in accordance with the invention.

Turning now additionally to FIG. 7, another variation of programming, learning or downloading of the download learning means 84 is explained. In this variation the download learning means 84 is temporarily connected to a computer, such as the illustrated portable laptop computer 115. The connection, may be via a wire cable or wireless communications link as will be readily understood by those skilled in the art. Of course, the desired signal enabling means 17'''' in this embodiment may be programmed in the vehicle or prior to installation in the vehicle. The laptop computer 115 may receive the desired signal set from an Internet website, for example, as will be readily appreciated by those skilled in the art.

Returning again to FIGS. 1 and 2, a method aspect of the invention is for piggybacking a desired function to a remote keyless entry (RKE) system in a vehicle 11, 11' of a type comprising a data communications bus 12, 12' as described above. The RKE system comprises an RKE transmitter 50, 50' to be carried by a user, an RKE receiver 13, 13', and an RKE controller 14, 14' connected to the RKE receiver for generating RKE signals on the data communications bus 12 responsive to the RKE transmitter. The method preferably comprises the steps of: connecting a piggyback controller 22, 30 to the data communications bus 12, 12'; and using the piggyback controller to perform a desired function based upon predetermined RKE signals generated on the data communications bus by the RKE controller so that the desired function is piggybacked on the RKE system. The vehicle 11 may further comprises at least one vehicle security sensor 23, and the piggyback controller comprises a piggyback alarm controller 22 connected to the at least one vehicle security sensor. Accordingly, in this embodiment, the desired function is switching the piggyback alarm controller 22 between an armed mode, capable of generating an alarm via the alarm indicator 25 based upon the at least one vehicle security sensor, and a disarmed mode.

In the embodiment as shown in FIG. 2, the vehicle 11' comprises an engine start circuit 31. The piggyback controller comprises a piggyback remote start controller 30 connected to the engine start circuit. The desired function is activating the engine start circuit 31. Of course, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A vehicle control system comprising:
    a data communications bus at the vehicle;
    at least one vehicle sensor;
    a remote keyless entry (RKE) system comprising an RKE transmitter to be carried by a user, an RKE receiver at the vehicle, an RKE controller connected to said RKE receiver for generating RKE signals on said data communications bus responsive to said RKE transmitter, and at least one RKE actuator for performing an RKE function responsive to the RKE signals; and
    a piggyback controller at the vehicle and connected to said data communications bus for performing a desired piggyback control function based upon predetermined RKE signals generated on said data communications bus by said RKE controller.

2. A vehicle control system according to claim 1 further comprising at least one vehicle sensor connected to said piggyback controller; and wherein said controller performs the desired piggyback control function also based upon the at least one vehicle sensor.

3. A vehicle control system according to claim 2 wherein said at least one vehicle sensor comprises at least one vehicle security sensor; wherein said piggyback controller comprises a piggyback alarm controller connected to said at least one vehicle security sensor; and wherein the desired piggyback control function is switching said piggyback alarm controller between an armed mode, capable of generating an alarm based upon said at least one vehicle security sensor, and a disarmed mode.

4. A vehicle control system according to claim 3 wherein the predetermined RKE signals comprise door lock and door unlock signals.

5. A vehicle control system according to claim 3 wherein the predetermined RKE signals comprise driver's door unlock signals for switching to the disarmed mode.

6. A vehicle control system according to claim 1 wherein the vehicle comprises an engine start circuit; wherein said piggyback controller comprises a piggyback remote start controller connected to the engine start circuit; and wherein the desired piggyback control function is activating the engine start circuit.

7. A vehicle control system according to claim 6 further comprising at least one vehicle sensor connected to said piggyback remote start controller.

8. A vehicle control system according to claim 6 wherein the predetermined RKE signals comprise driver's door unlock signals for activating the engine start circuit.

9. A vehicle control system according to claim 1 wherein said piggyback controller comprises desired signal enabling means for permitting performance of the desired piggyback control function based upon predetermined RKE signals for a corresponding desired vehicle from a plurality of sets of RKE signals for different vehicles.

10. A vehicle control system according to claim 9 wherein said desired signal enabling means comprises:
    a memory for storing a plurality of sets of RKE signals for different vehicles; and
    a selector for selecting predetermined RKE signals from the plurality of different sets of RKE signals for different vehicles.

11. A vehicle control system according to claim 10 wherein said selector comprises a user selector for permitting a user to select the predetermined RKE signals.

12. A vehicle control system according to claim 9 wherein said desired signal enabling means comprises bus learning means for learning the predetermined RKE signals based upon RKE signals on the data communications bus.

13. A vehicle control system according to claim 9 wherein said desired signal enabling means comprises download learning means for learning the predetermined RKE signals from a downloading device.

14. A vehicle control system according to claim 1 wherein the predetermined RKE signals comprise at least one of door lock signals, door unlock signals, trunk release signals, light control signals, and horn control signals.

15. A vehicle control system according to claim 1 wherein the predetermined RKE signals comprise a predetermined pattern of at least one of door lock signals, door unlock signals, trunk release signals, light control signals, and horn control signals.

16. A vehicle security system for a vehicle of a type comprising a data communications bus at the vehicle, a remote keyless entry (RKE) transmitter to be carried by a user, an RKE receiver at the vehicle, an RKE controller connected to the RKE receiver for generating RKE signals on the data communications bus responsive to the RKE transmitter, and at least one RKE actuator for performing an RKE function the vehicle security system comprising:

at least one vehicle security sensor at the vehicle; and a piggyback alarm controller switching between an armed mode and a disarmed mode based upon predetermined RKE signals generated on the data communications bus by the RKE controller, said piggyback alarm controller when in the armed mode being capable of generating an alarm based upon said at least one vehicle security sensor.

17. A vehicle security system according to claim 16 wherein the predetermined RKE signals comprise door lock and door unlock signals.

18. A vehicle security system according to claim 16 wherein the predetermined RKE signals comprise driver's door unlock signals for switching to the disarmed mode.

19. A vehicle security system according to claim 16 wherein said piggyback alarm controller comprises desired signal enabling means for permitting switching between modes based upon predetermined RKE signals for a corresponding desired vehicle from a plurality of sets of RKE signals for different vehicles.

20. A vehicle security system according to claim 19 wherein said desired signal enabling means comprises:

a memory for storing a plurality of sets of RKE signals for different vehicles; and a selector for selecting predetermined RKE signals from the plurality of different sets of RKE signals for different vehicles.

21. A vehicle security system according to claim 20 wherein said selector comprises a user selector for permitting a user to select the predetermined RKE signals.

22. A vehicle security system according to claim 19 wherein said desired signal enabling means comprises bus learning means for learning the predetermined RKE signals based upon RKE signals on the data communications bus.

23. A vehicle security system according to claim 19 wherein said desired signal enabling means comprises download learning means for learning the predetermined RKE signals from a downloading device.

24. A vehicle security system according to claim 16 wherein the predetermined RKE signals comprise at least one of door lock signals, door unlock signals, trunk release signals, light control signals, and horn control signals.

25. A vehicle security system according to claim 16 wherein the predetermined RKE signals comprise a predetermined pattern of at least one of door lock signals, door unlock signals, trunk release signals, light control signals, and horn control signals.

26. A remote start system for a vehicle of a type comprising a data communications bus at the vehicle, a remote keyless entry (RKE) transmitter to be carried by a user, an RKE receiver at the vehicle, an RKE controller connected to the RKE receiver for generating RKE signals on the data communications bus responsive to the RKE transmitter, at least one RKE actuator for performing an RKE function responsive to RKE signals, and an engine start circuit, the remote start system comprising:

at least one vehicle sensor; and a piggyback remote start controller for activating the engine start circuit based upon predetermined RKE signals generated on the data communications bus by the RKE controller and said at least one vehicle sensor.

27. A remote start system according to claim 26 wherein the predetermined RKE signals comprise door lock and door unlock signals.

28. A remote start system according to claim 27 wherein the predetermined RKE signals comprise driver's door unlock signals.

29. A remote start system according to claim 26 wherein said piggyback remote start controller comprises desired signal enabling means for permitting activation of the engine start circuit based upon predetermined RKE signals for a corresponding desired vehicle from a plurality of sets of RKE signals for different vehicles.

30. A remote start system according to claim 29 wherein said desired signal enabling means comprises:

a memory for storing a plurality of sets of RKE signals for different vehicles; and a selector for selecting predetermined RKE signals from the plurality of different sets of RKE signals for different vehicles.

31. A remote start system according to claim 30 wherein said selector comprises a user selector for permitting a user to select the predetermined RKE signals.

32. A remote start system according to claim 29 wherein said desired signal enabling means comprises bus learning means for learning the predetermined RKE signals based upon RKE signals on the data communications bus.

33. A remote start system according to claim 29 wherein said desired signal enabling means comprises download learning means for learning the predetermined RKE signals from a downloading device.

34. A remote start system according to claim 26 wherein the predetermined RKE signals comprise at least one of door lock signals, door unlock signals, trunk release signals, light control signals, and horn control signals.

35. A remote start system according to claim 26 wherein the predetermined RKE signals comprise a predetermined pattern of at least one of door lock signals, door unlock signals, trunk release signals, light control signals, and horn control signals.

36. A method for piggybacking a desired function to a remote keyless entry (RKE) system in a vehicle of a type comprising a data communications bus, the RKE system comprising an RKE transmitter to be carried by a user, an RKE receiver, an RKE controller connected to the RKE receiver for generating RKE signals on the data communications bus responsive to the RKE transmitter, and at least one RKE actuator for performing an RKE function responsive to RKE signals, the method comprising the steps of:

connecting a piggyback controller to the data communications bus; and using the piggyback controller to perform a desired piggyback control function based upon predetermined RKE signals generated on the data communications bus by the RKE controller.

37. A method according to claim 36 wherein the vehicle further comprises at least one vehicle security sensor; wherein the piggyback controller comprises a piggyback alarm controller connected to the at least one vehicle security sensor; and wherein the desired piggyback control function is switching the piggyback alarm controller between an armed mode, capable of generating an alarm based upon the at least one vehicle security sensor, and a disarmed mode.

38. A method according to claim 36 wherein the vehicle comprises an engine start circuit; wherein the piggyback controller comprises a piggyback remote start controller connected to the engine start circuit; and wherein the desired piggyback control function is activating the engine start circuit.

39. A method according to claim 36 wherein further comprising the step of permitting performance of the desired piggyback control function based upon predetermined RKE signals for a corresponding desired vehicle from a plurality of sets of RKE signals for different vehicles.

40. A method according to claim 39 wherein the step of permitting performance comprises the steps of:

storing a plurality of sets of RKE signals for different vehicles in the piggyback controller; and selecting predetermined RKE signals from the plurality of stored sets of RKE signals for different vehicles.

41. A method according to claim 39 wherein the step of permitting performance comprises learning the predetermined RKE signals based upon RKE signals on the data communications bus.

42. A method according to claim 39 wherein the step of permitting performance comprises learning the predetermined RKE signals from a downloading device.

43. A method according to claim 36 wherein the predetermined RKE signals comprise at least one of door lock signals, door unlock signals, trunk release signals, light control signals, and horn control signals.

44. A method according to claim 36 wherein the predetermined RKE signals comprise a predetermined pattern of at least one of door lock signals, door unlock signals, trunk release signals, light control signals, and horn control signals.

* * * * *